United States Patent

Wakamatsu et al.

[11] 3,727,488
[45] Apr. 17, 1973

[54] SYSTEM FOR SHIFTING GEAR POSITIONS OF AUTOMATIC TRANSMISSIONS FOR AUTOMOTIVE VEHICLES AT PREDETERMINED SHIFT POINTS

[75] Inventors: Hisato Wakamatsu; Hiroshi Fujinami, both of Kariya; Tokuhiro Kurebayashi, Anjo, all of Japan

[73] Assignee: Nipponsenso Co., Ltd., Kariya-shi, Aichi-ken, Japan

[22] Filed: July 20, 1971

[21] Appl. No.: 164,316

[30] Foreign Application Priority Data

July 21, 1970   Japan..............................45/63855

[52] U.S. Cl.....................74/866, 74/752 D, 74/869
[51] Int. Cl............................B60k 21/00, F16h 3/74
[58] Field of Search..........................................74/866

[56] References Cited

UNITED STATES PATENTS 3,618,417   11/1971   Brown....................................74/365
3,621,735   11/1971   Lemieux...........................74/866 X
3,646,835   3/1972    Ito et al. ..........................74/866 X

*Primary Examiner*—Arthur T. McKeon
*Attorney*—Cushman, Darby & Cushman

[57] ABSTRACT

A system for shifting the gear positions of an automatic transmission for a vehicle at a plurality of predetermined shift points in which an r.p.m. detecting a.c. generator is connected to the wheel driving system and the output from the AC generator is converted into a pulse signal. The number of pulses appearing within unit time is counted and the count is classified to obtain a plurality of digital vehicle speed signals corresponding to a plurality of vehicle speed settings. The accelerator pedal is connected to a movable contact of a multi-contact switch having a plurality of stationary contacts so as to obtain a plurality of digital throttle position signals representative of various positions of the accelerator pedal. The digital vehicle speed signal and digital throttle position signal are applied to a logic circuit to obtain a shift signal.

1 Claim, 11 Drawing Figures

INVENTORS
HISATO WAKAMATSU
HIROSHI FUJINAMI
TORUHIRO KUREBAYASHI
BY Cushman, Darby & Cushman
ATTORNEYS

SYSTEM FOR SHIFTING GEAR POSITIONS OF AUTOMATIC TRANSMISSIONS FOR AUTOMOTIVE VEHICLES AT PREDETERMINED SHIFT POINTS

BACKGROUND OF THE INVENTION

1. Field of the Invention

This invention relates to improvements in a system for electrically shifting the gear position of automatic transmissions for automotive vehicles at a plurality of predetermined shift points.

2. Description of the Prior Art

In a prior art system generally used in an automatic transmission for automotive vehicles for electrically shifting the gear position of the automatic transmissions at a plurality of shift points, a DC generator is connected to the wheel driving system so as to utilize its output as a vehicle speed responsive signal, and the amount of depression of the accelerator pedal actuated by the driver is converted into a DC signal by the combination of a multicontact switch and resistors. These two signals are compared with each other so as to energize or de-energize an electromagnetic relay thereby generating a shift signal.

Such a prior art system has some drawbacks in that the vehicle speed responsive signal delivered from the DC generator depending on the r.p.m. of the input shaft of the DC generator is unstable and subject to undesirable variations due to the fact that the resistance of the windings and the resistance and permeability of the magnetic material are subject to variations depending on ambient temperature, the dimensions of the air gap portion of the magnetic circuit are subject to fluctuations depending on the manufacturing technique, and the output voltage is variable due to wear of the commutator and brushes. The prior art system is further unrelieable in that the stability of the accelerator pedal position converter delivering the accelerator pedal position responsive signal is affected by undesirable variations in the output voltage due to the temperature dependence of the resistors and in the power supply voltage. The prior art system is further defective in that the stability of the electromagnetic relay detecting the shift point is affected by undesirable variations in the detected voltage due to the temperature dependence of the relay coil and due to the fact that the contacts are subject to wear during operation over an extended period of time. Thus, high costs are incurred in mass production and later inspection is necessary due to there being many parts that must be checked to regulate the output.

SUMMARY OF THE INVENTION

It is a primary object of the present invention to provide a novel and improved system for shifting the gear position of an automatic transmission for an automotive vehicle at a plurality of predetermined shift points comprising means for producing a plurality of digital vehicle speed signals each representative of a vehicle speed lying within one of a plurality of vehicle speed ranges, means for producing a plurality of digital throttle position signals each representative of a throttle position among a plurality of throttle positions, a plurality of AND gates whose number is equal to the number of said digital throttle position signals, means for applying said digital vehicle speed signals and said digital throttle position signals to the corresponding one of said AND gates so as to derive respective outputs from said AND gates, an OR gate connected to said AND gates, a memory connected to said OR gate for storing the output from said OR gate, and means for applying the signal stored in said memory to actuating means for shifting the gear position of said automatic transmission.

According to the present invention, parts for establishing the vehicle speed settings are only required to be regulated in regard to timing and any other regulation is unnecessary.

DESCRIPTION OF THE PREFERRED EMBODIMENT

Figure 1:
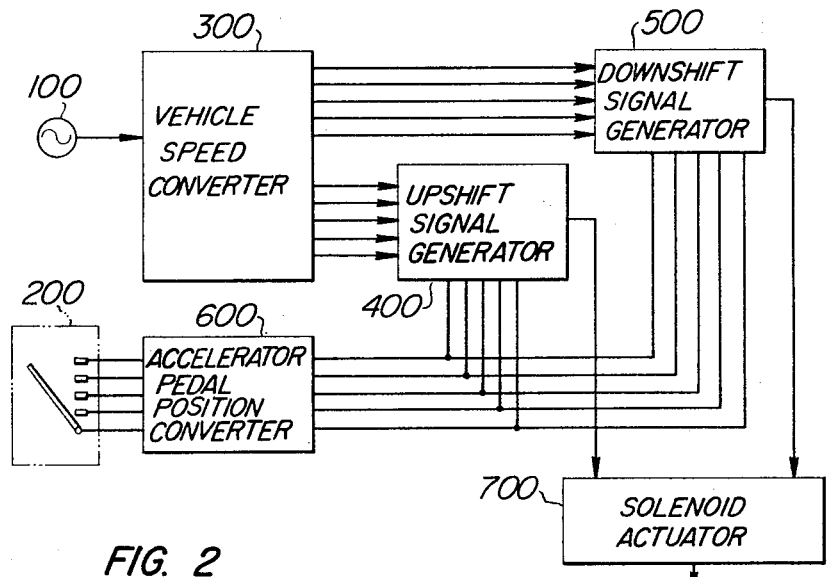
FIG. 1 is a block diagram of a system embodying the present invention.

Referring to FIG. 1, there is shown a block diagram of a system for electrically shifting the gear position at a plurality of predetermined shift points according to the present invention. The system comprises a vehicle speed sensor or r.p.m. detecting AC generator 100 mounted on the output shaft of an automatic transmission in a vehicle, a multicontact switch 200 responsive to the depression of the accelerator pedal, a converter 300 for converting the vehicle speed into an electrical signal, an upshift signal generator 400, a downshift signal generator 500, a converter 600 for converting the amount of depression or position of the accelerator pedal into an electrical signal, and a solenoid actuator 700 for actuating a solenoid 800. The operation of the system is such that the signal generated by the r.p.m.

detecting AC generator 100 is applied to the vehicle speed converter 300 to be converted into a vehicle speed responsive signal, while the signal appearing from the multi-contact switch 200 responsive to the amount of depression or position of the accelerator pedal is applied to the accelerator pedal position converter 600 to be converted into an accelerator pedal position responsive signal. The output signal delivered from the vehicle speed converter 300 is a digital signal representative of the vehicle speed, while the output signal delivered from the accelerator pedal position converter 600 is a digital signal representative of the throttle position, and these two signals are applied to the upshift signal generator 400. The upshift signal generator 400 is actuated to generate an upshift signal when the relation between the vehicle speed and the amount of depression of the accelerator pedal satisfies a predetermined condition. The upshift signal is applied to the solenoid actuator 700 for energizing or de-energizing the solenoid 800 so as to carry out an upshift.

In a downshift, the digital signal representative of the vehicle speed and the digital signal representative of the throttle position are applied from the vehicle speed converter 300 and accelerator pedal position converter 600 to the downshift signal generator 500. The downshift signal generator 500 is actuated to generate a downshift signal when the relation between the vehicle speed and the amount of depression of the acclerator pedal satisfies a predetermined condition. The downshift signal is applied to the solenoid actuator 700 for de-energizing or energizing the solenoid 800 so as to attain a downshift.

The preceeding description of the invention is now to be described in detail with respect to the remaining drawings. However, attention is directed to the patent of Wakamatsu et al. 3,675,511 which includes certain exemplary details of the specific circuit arrangements which are adaptable to the present invention.

Figure 2:
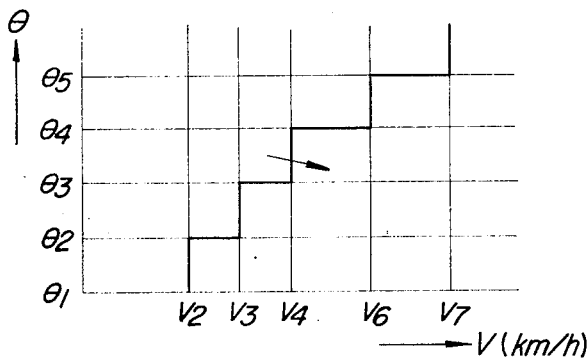
FIG. 2 is a shift diagram showing the shift points from low to high gear.
Figure 3:
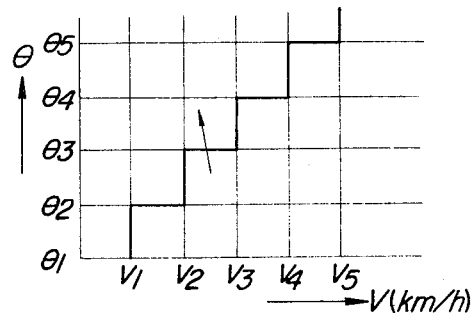
FIG. 3 is a shift diagram showing the shift points from high to low gear.

Referring to FIGS. 2 and 3, the position $\theta$ of the accelerator pedal is divided into five positions $\theta_1, \theta_2, \theta_3, \theta_4$ and $\theta_5$. The vehicle speed V includes five settings $V_2$, $V_3$, $V_4$, $V_6$ and $V_7$ in FIG. 2, while it includes five settings $V_1, V_2, V_3, V_4$ and $V_5$ in FIG. 3. FIG. 2 shows a plurality of predetermined shift points at which an upshift from low to high gear, for example, from the first to second speed occurs. It will be seen from FIG. 2 that an upshift from low to high gear occurs at a vehicle speed V higher than $V_2, V_3, V_4, V_6$ and $V_7$ when the position $\theta$ of the accelerator pedal is $\theta_1, \theta_2, \theta_3, \theta_4$ and $\theta_5$, respectively. FIG. 3 shows a plurality of predetermined shift points at which a downshift from high to low gear, for example, from the second to first speed occurs. It will be seen from FIG. 3 that a downshift from high to low gear occurs at a vehicle speed V lower than $V_1, V_2$, $V_3, V_4$ and $V_5$ when the position $\theta$ of the accelerator pedal is $\theta_1, \theta_2, \theta_3, \theta_4$ and $\theta_5$, respectively.

Figure 4:
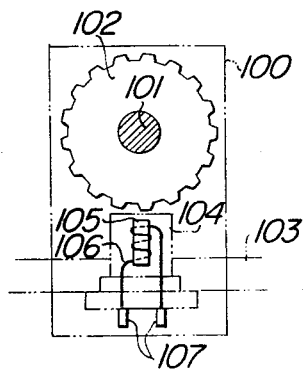
FIG. 4 is a schematic side elevational view showing the structure of an r.p.m. detecting AC generator preferably used in the system shown in FIG. 1.

The vehicle speed sensor or r.p.m. detecting AC generator 100 has a structure as shown in FIG. 4. The r.p.m. detecting AC generator 100 is composed of a toothed disc 102 and an r.p.m. detector 104. The toothed disc 102 is secured at its center of rotation to the output shaft 101 of the transmission and is a disc plate of magnetic material having thirty-two equally spaced teeth formed along its circumference. The r.p.m. detector 104 is mounted on the transmission housing 103 at a position closely adjacent to the toothed disc 102 in a direction which is diametrically opposite to the latter. The r.p.m. detector 104 is composed of a permanent magnet 105 and a coil 106 wound around the permanent magnet 105. The permanent magnet 105 and the coil 106 are housed in a suitable casing of non-magnetic material and the casing is mounted on the transmission housing 103 so that one end of the permanent magnet 105 is disposed in close proximity to the outer periphery of the toothed disc 102. As the tooth portion of the toothed disc 102 passes through the magnetic field of the permanent magnet 105 as a result of rotation of the toothed disc 102, a variation takes place in the leakage flux of the permanent magnet 105 so that an electromotive force is produced in the coil 106. In the case of the illustrated example, one complete rotation of the toothed disc 102 produces thirty-two voltage pulses. A voltage signal at an AC voltage having a frequency $n \times N$ is generally obtained when the toothed disc 102 having $n$ teeth rotates at a number of revolutions N per minute. This voltage signal appears across output terminals 107.

Figure 5:
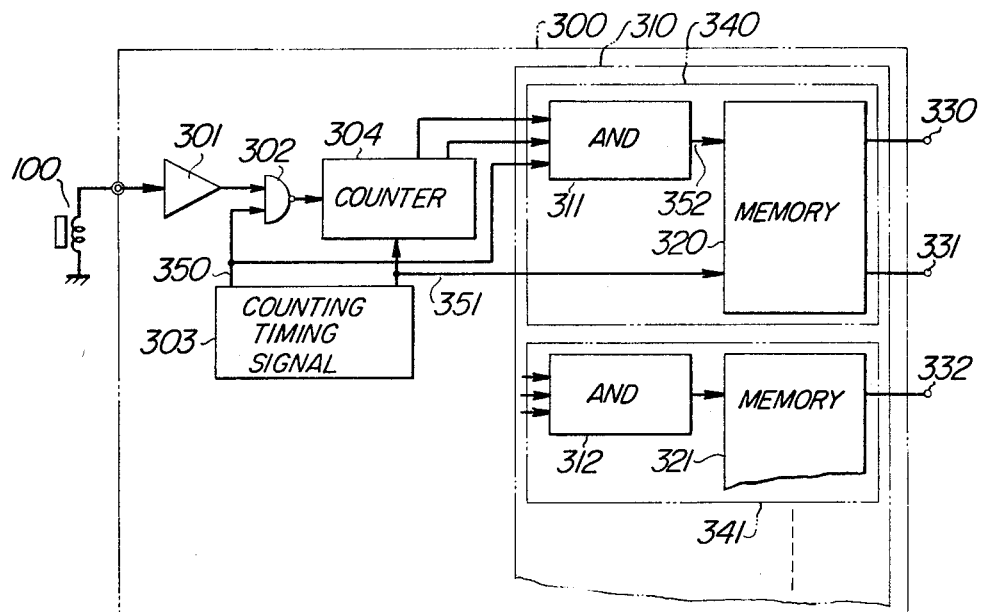
FIG. 5 is a block diagram showing the structure of a vehicle speed converter preferably used in the system shown in FIG. 1.

In the system of the present invention, the output delivered from the r.p.m. detecting AC generator 100 responsive to the rotation of the output shaft of the transmission, hence, the wheel driving axle is converted into a pulse signal and the number of pulses per unit time is counted to obtain a signal representative of the vehicle speed. The vehicle speed converter 300 connected to the r.p.m. detecting AC generator 100 has a structure as shown in FIG. 5. Referring to FIG. 5, the vehicle speed converter 300 includes an amplifier 301, an AND gate 302, a counting timing signal generator 303, a counter 304 composed of a plurality of flip-flops, and a vehicle speed discriminating circuit 310 for discriminating the vehicle speed. The amplifier 301 amplifies the AC output signal of sinusoidal waveform delivered from the vehicle speed sensor or r.p.m. detecting AC generator 100 and converts the signal into retangular pulses. The counting timing signal generator 303 generates a counting timing signal which is applied to the AND gate 302 so that the counter 304 counts the number of rectangular pulses appearing per unit time thereby converting the vehicle speed into a digital vehicle speed signal. The counting timing signal generator 303 generates also a reset signal which is applied to the counter 304 so that it is repeatedly reset to respond instantaneously to any variation in the vehicle speed. In the illustrated example, the counting timing signal has a duration of 40 m sec, the reset signal has a duration of 5 m sec. and the repetition period of the reset signal is 80 m sec. The vehicle speed discriminating circuit 310 is composed of a plurality of vehicle speed discriminators 340, 341. More precisely, the vehicle speed discriminating circuit 310 comprises a first vehicle speed discriminator 340 composed of a logic circuit 311 and a memory 320, a second vehicle speed discriminator 341 composed of a logic circuit 312 and a memory 321, and other discriminators (not shown) of the same structure. The reason why the vehicle speed discriminating circuit 310 is composed of a plurality of such vehicle speed discriminators 340, 341, is that the vehicle speed which is one of the factors for determining the shift point is divided into a plurality of settings and thus the discriminators are required in the number corresponding to the number of vehicle speed settings. In the illustrated example, thirteen such discriminators 340, 341, are provided.

The operation of the vehicle speed converter 300 will be described with reference to FIG. 5. The a.c. output signal of sinusoidal waveform delivered from the vehicle speed sensor or r.p.m. detecting AC generator 100 is amplified and shaped by the amplifier 301 into a pulse signal of rectangular waveform representative of the vehicle speed. This pulse signal is applied to the AND gate 302 to which the counting timing signal is also applied from the counting timing signal generator 303 by a lead 350 so that the portion of the vehicle speed responsive pulse signal which arrives within the counting time is solely applied to the counter 304. The counter 304 counts the number of vehicle speed responsive pulses in accordance with binary notation. In the illustrated example, it includes seven flip-flops. Since the vehicle speed is to be represented by the decimal notation, the binary number counted by the counter 304 must be converted into the decimal number in order to obtain a vehicle speed setting. This conversion is carried out by the logic circuits in the vehicle speed discriminators 340, 341. More precisely, the logic circuit 311 in the vehicle speed discriminator 340 takes the logical product of the signals applied from the counter 304 and counting timing signal generator 303 to obtain a vehicle speed setting. The logic circuit 312 in the vehicle speed discriminator 341 operates similarly to obtain another vehicle speed setting. Similarly, the logic circuits in the other vehicle speed discriminators (not shown) operate to obtain other vehicle speed settings. The binary-to-decimal conversion is well known in the art and any explanation of it is unnecessary. The output from the logic circuit 311 is applied to the memory 320 to be stored therein. The memory 320 is a bistable multivibrator which acts as a bistable memory. Thus, a voltage of high level or low level is stored in the memory 320. In the illustrated example, a voltage of high level appears on the side of an output terminal 330 of the memory 320 and a voltage of low level appears on the side of an output terminal 331 of the memory 320 in response to the application of the output from the logic circuit 311. The memory 321 and those not shown operate similarly.

In the present invention, the memories 320, 321, are adapted to temporary storage for the reason that the vehicle speed is continuously varying as described with regard to the counter 304. The storage of the memory 320 is erased by the reset signal applied from the counting timing signal generator 303 by a lead 351. In response to the application of the reset signal to the memory 320 by the lead 351, a voltage of low level appears now on the side of the output terminal 330 and a voltage of high level appears on the side of the output terminal 331. The memory 320 is continuously held in this state even when the reset signal applied by the lead 351 disappears. Further, the memory 320 is held in such a state when the vehicle speed is lower than the predetermined setting. When the vehicle speed is higher than the predetermined setting, this state is inverted by the signal applied from the logic circuit 311 by the lead 352 so that a voltage of high level appears on the side of the output terminal 330 and a voltage of low level appears on the side of the output terminal 331. This memory is erased upon application of the subsequent reset signal and a voltage of low level and a voltage of high level appear on the side of the respective output terminals 330 and 331 again. The above operation is repeated every 80 ms. The other memories 321, operate similarly.

Figure 6:
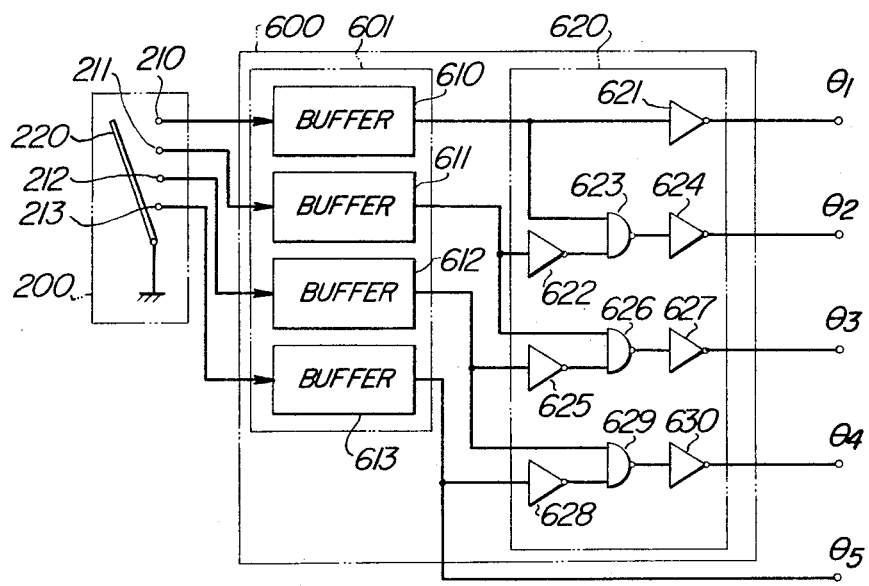
FIG. 6 is a block diagram showing the structure of an accelerator pedal position converter preferably used in the system shown in FIG. 1.

FIG. 6 shows the structure of the accelerator pedal position converter 600 which converts the respective positions of the accelerator pedal into corresponding digital signals representative of the throttle position.

Referring to FIG. 6, the accelerator pedal position converter 600 is composed of multicontact switch 200 operating in synchronism with the accelerator pedal, a logic circuit 620 which converts the on-off signal applied from the multicontact switch 200 into an accelerator pedal position signal representative of the amount of depression of the accelerator pedal, and a buffer circuit 601 connecting the multicontact switch 200 with the logic circuit 620. The multicontact switch 200 is a four-contact switch which is composed of a movable contact 220 and four stationary contacts 210, 211, 212 and 213. In the switch 200, the movable contact 220 is operatively connected with the accelerator pedal so that it operates in synchronism with the accelerator pedal in response to the actuation of the accelerator pedal. The number of stationary contacts of the multicontact switch 200 is determined by the number of ranges dividing the full stroke of the accelerator pedal. In other words, the full stroke of the accelerator pedal is divided into N which is given by N = the number of stationary contacts + 1. In the illustrated example, the multicontact switch 200 is provided with four stationary contacts 210, 211, 212 and 213 since the full accelerator pedal stroke is divided into five ranges.

Describing in more detail, the movable contact 220 of the multicontact switch 200 is not in contact with all the stationary contacts within the range in which the accelerator pedal is depressed by less than ¼ of the full stroke. The movable contact 220 is brought into contact with the stationary contact 210 within the range in which the accelerator pedal is depressed by more than ¼ but less than ½ of the full stroke. The movable contact 220 is brought into contact with the stationary contact 211 in addition to the stationary contact 210 within the range in which the accelerator pedal is depressed by more than ½ but less than ¾ of the full stroke. The movable contact 220 is brought into contact with the stationary contact 212 in addition to the stationary contacts 210 and 211 within the range in which the accelerator pedal is depressed by more than ¾ stroke but less than the full stroke. The movable contact 220 is in contact with all the stationary contacts 210, 211, 212 and 213 when the accelerator pedal is kicked down to the full stroke. Therefore, the full stroke of the accelerator pedal is divided into five ranges by the multicontact switch 200 and the number of the stationary contacts in contact with the movable contact is successively increased as the accelerator pedal is successively depressed.

Figure 7:
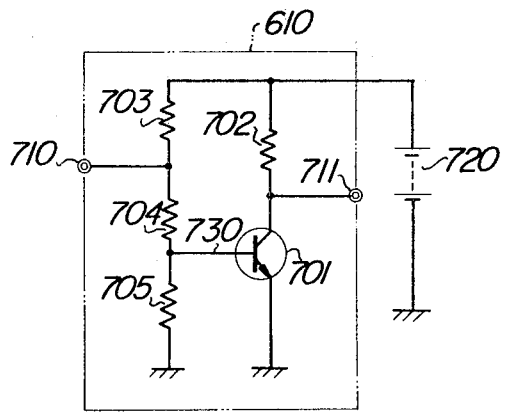
FIG. 7 is an electrical circuit diagram showing in detail the structure of a buffer circuit preferably used in the accelerator pedal position converter shown in FIG. 6.

The multicontact switch 200 is connected to the logic circuit 620 by the buffer circuit 601 which acts to prevent transmission of various surge noises to the logic circuit 620 from the multicontact switch 200 and protect integrated circuits used in the logic circuit 620. The buffer circuit 601 is composed of four buffer elements 610, 611, 612 and 613 so that each buffer element can be connected to the corresponding stationary contact of the multicontact switch 200. These four buffer elements 610, 611, 612 and 613 are entirely the same in structure, and a preferred structure of the buffer element 610 is shown in FIG. 7 by way of example. Referring to FIG. 7, the buffer element 610 includes an input terminal 710, an output terminal 711, a buffer transistor 701, a load resistor 702 for the transistor 701, and bias resistors 703, 704 and 705 for the transistor 701. A DC power supply 720 supplied power to the buffer element 610.

The operation of the buffer element 610 will be described with reference to FIG. 7. The stationary contact 210 of the multicontact switch 200 is connected to the input terminal 710 of the buffer element 610. When the movable contact 220 (which is grounded at one end thereof) of the multicontact switch 200 is not in contact with the stationary contact 210, the transistor 701 is conducting due to the supply of base current corresponding to a voltage obtained by dividing the power supply voltage by the combined resistance of the series-connected bias resistors 703 and 704 and the resistance of the bias resistor 705. In this case, the output appearing at the output terminal 711 is at its low voltage level. When the movable contact 220 of the multi-contact switch 200 is brought into contact with the stationary contact 210, the series-connected bias resistors 704 and 705 are short-circuited across the multicontact switch 200 with the result that the base current supplied to the transistor 701 is cut off and the transistor 701 is cutoff. Thus the output appearing at the output terminal 711 is at its high voltage level. Therefore, a signal of low or high voltage level appears at the output terminal 711 of the buffer element 610 depending on the on-off of the multicontact switch 200. Output signals of the buffer elements 610, 611, 612 and 613 are applied to the logic circuit 620 shown in FIG. 6.

The logic circuit 620 converts the signals applied from the buffer elements 610, 611, 612 and 613 into an accelerator pedal position signal representative of the amount of depression of the accelerator pedal. The logic circuit 620 includes ten logic elements as shown. Referring to FIG. 6, the movable contact 220 of the multicontact switch 200 is not in contact with all of the stationary contacts 210, 211, 212 and 213 when the depression of the accelerator pedal is less than ¼ of the full stroke, and all the buffer elements 610, 611, 612 and 613 deliver output signals of low voltage level. In this case, the output signal of low voltage level delivered from the buffer element 610 is inverted by a inverter 621 so that an output signal $\theta_1$ of high voltage level appears from the inverter 621. The output signal of low voltage level delivered from the buffer element 610 is also applied to a NAND gate 623, while the output signal of low voltage level delivered from the buffer element 610 is applied to a NAND gate 623, while the output signal of low voltage level delivered from the buffer element 611 is applied to an inverter 622 to be turned into a signal of high voltage level which is applied from the inverter 622 to the NAND gate 623. The output signal of high voltage level appearing from the NAND gate 623 is applied to a inverter 624 to be inverted thereby so that an output signal $\theta_2$ of low voltage level appears from the inverter 624. The output signal of low voltage level delivered from the buffer element 611 is also applied to a NAND gate 626, while the output signal of low voltage level delivered from the buffer element 612 is applied to an inverter 625 to be turned into a signal of high voltage level which is applied from the inverter 625 to the NAND gate 626. The output signal of high voltage level appearing from the NAND gate 626 is applied to an inverter 627 to be inverted thereby so that an output signal $\theta_3$ of low voltage level appears from the inverter 627. The output signal of low voltage level delivered from the buffer element 12 is also applied to a NAND gate 629, while the output signal of low voltage level delivered from the buffer element 613 is applied to an inverter 628 to be turned into a signal of high voltage level which is applied from the inverter 628 to the NAND gate 629. The output signal of high voltage level appearing from the NAND gate 629 is applied to an inverter 630 to be inverted thereby so that an output signal $\theta_4$ of low voltage level appears from the inverter 630. The output signal of low voltage level delivered from the buffer element 613 appears directly as an output $\theta_5$. It will be apparent from the above description that the output $\theta_1$ is only of high voltage level and the other outputs $\theta_2$, $\theta_3$, $\theta_4$ and $\theta_5$ are of low voltage level in the range in which the depression of the accelerator pedal is less than ¼ of the full stroke. Therefore, the output $\theta_1$ of high voltage level may be derived as an accelerator pedal position signal representative of the range in which the depression of the accelerator pedal is less than ¼ of the full stroke.

The movable contact 220 of the multicontact switch 200 is brought into contact with the stationary contact 210 in the range in which the depression of the accelerator pedal is more than ¼ but less than ½ of the full stroke. In this case, the buffer element 610 delivers an output signal of high voltage level, while the other buffer elements 611, 612 and 613 deliver output signals of low voltage level as in the case of the range in which the depression of the accelerator pedal is less ¼ of the full stroke. The output signal of high voltage level delivered from the buffer element 610 is inverted by the inverter 621 so that the output $\theta_1$ from the inverter 621 is now of low voltage level. The output signal of high voltage level delivered from the buffer element 610 is also applied to the NAND gate 623, while the output signal of low voltage level delivered from the buffer element 611 is applied to the inverter 622 to be turned into a signal of high voltage level which is applied from the inverter 622 to the NAND gate 623. The output signal of low voltage level appearing from the NAND gate 623 is applied to the inverter 624 to be inverted thereby so that the output $\theta_2$ from the inverter 624 is of high voltage level. The other outputs $\theta_3$, $\theta_4$ and $\theta_5$ are of low voltage level as in the range in where the depression of the accelerator pedal is less than ¼ of the full stroke. It will thus be seen that the output $\theta_2$ is only of high voltage level and the other outputs $\theta_1$, $\theta_3$, $\theta_4$ and $\theta_5$ are of low voltage level in the range in which the depression of the accelerator pedal is more than ¼ but less than ½ of the full stroke. The output $\theta_2$ of high voltage level may be derived as an accelerator pedal position signal representative of the range in which the depression of the accelerator pedal is more than ¼ but less than ½ of the full stroke. Similarly, the output $\theta_3$ is only of high voltage level in the range in which the depression of the accelerator pedal is more than ½ but less than ¾ of the full stroke, and the output $\theta_4$ is only of high voltage level in the range in which the depression of the accelerator pedal is more than ¾ stroke but less than the full stroke. When the depression of the accelerator pedal is the full stroke, the output $\theta_5$ is only of high voltage level. These outputs $\theta_3$, $\theta_4$ and $\theta_5$ of high voltage level may be derived as accelerator pedal position signals representative of the respective positions of the accelerator pedal.

Figure 8:
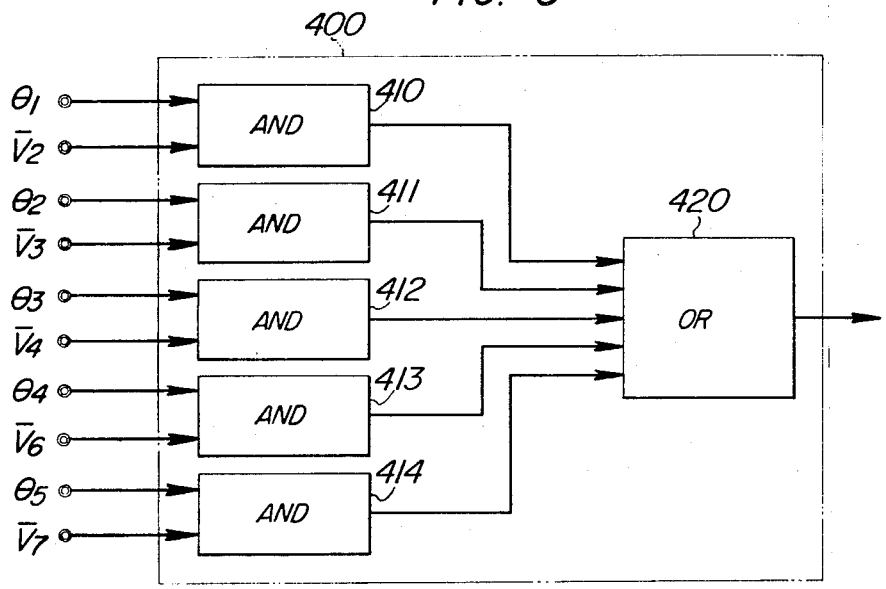
FIG. 8 is a block diagram showing the structure of an upshift signal generator preferably used in the system shown in FIG. 1.

FIG. 8 is a block diagram of the upshift signal generator 400 which generates an upshift signal in response to the application of the output signal or digital signal representative of the vehicle speed from the vehicle speed converter 300 and the output signal or digital signal representative of the throttle position from the accelerator pedal position converter 600. The upshift signal generator 400 is composed of a plurality of AND gates 410, 411, 412, 413 and 414 for taking the logic product of the digital signal representative of the vehicle speed and the digital signal representative of the throttle position, and an OR gate 420 for taking the logical sum of outputs from the AND gates 410, 411, 412, 413 and 414. The digital throttle position signal $\theta_1$ described with reference to FIG. 6 and the digital vehicle speed signal $V_2$ representative of a vehicle speed higher than the vehicle speed setting $V_2$ corresponding to the accelerator pedal position $\theta_1$ are applied to the AND gate 410. Similarly, the digital throttle position signals $\theta_2$, $\theta_3$, $\theta_4$ and $\theta_5$ and the digital vehicle speed signals $V_3$, $V_4$, $V_6$ and $V_7$ are applied to the AND gates 411, 412, 413 and 414, respectively. The outputs from these AND gates 410, 411, 412, 413 and 414 are applied to the OR gate 420 to obtain an upshift signal thereby carry out an upshift as shown in FIG. 2.

Figure 9:
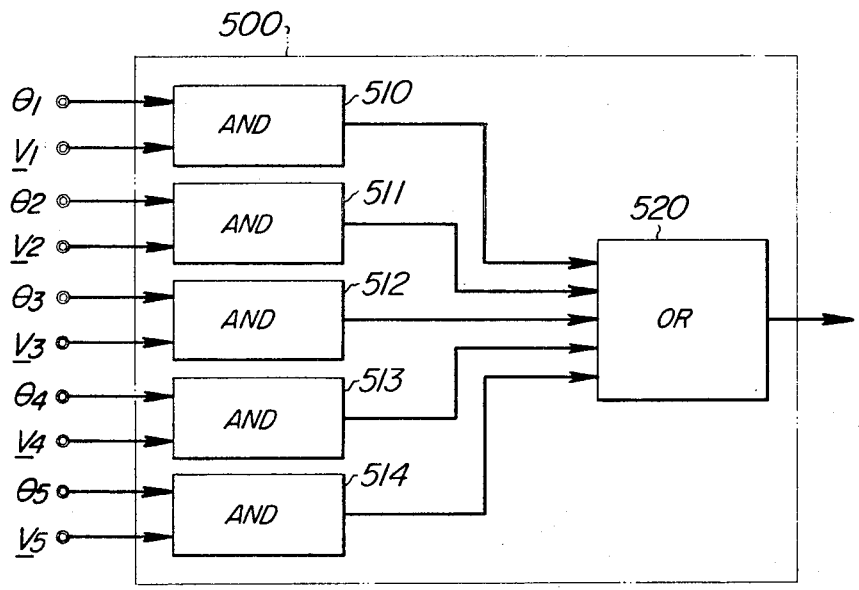
FIG. 9 is a block diagram showing the structure of a downshift signal generator preferably used in the system shown in FIG. 1.

FIG. 9 is a block diagram of the downshift signal generator 500 which generates a downshift signal in response to the application of the digital vehicle speed signal and the digital throttle position signal. The downshift signal generator 500 is composed of a plurality of AND gates 510, 511, 512, 513 and 514 for taking the logical product of the digital vehicle speed signal and the digital throttle position signal, and an OR gate 520 for taking the logical sum of outputs from the AND gates 510, 511, 512, 513 and 514. The digital throttle position signal $\theta_1$ described with reference to FIG. 6 and the digital vehicle speed signal $V_1$ representative of a vehicle speed lower than the vehicle speed setting $V_1$ corresponding to the accelerator pedal position $\theta_1$ are applied to the AND gate 510. Similarly, the digital throttle position signals $\theta_2$, $\theta_3$, $\theta_4$ and $\theta_5$ and the digital vehicle speed signals $V_2$, $V_3$, $V_4$ and $V_5$ are applied to the AND gate 511, 512, 513 and 514, respectively. The outputs from these AND gates 510, 511, 512, 513 and 514 are applied to the OR gate 520 to obtain a downshift signal thereby to carrying out a downshift as shown in FIG. 3.

Figure 10:
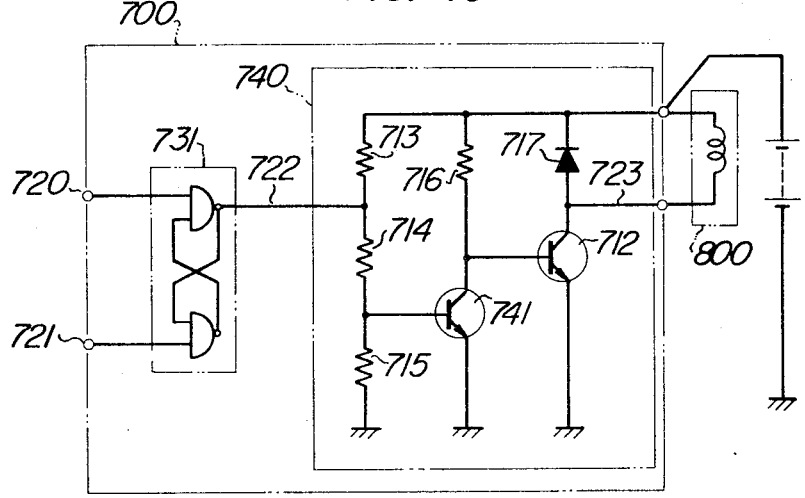
FIG. 10 is a block diagram showing the structure of a solenoid actuator preferably used in the system shown in FIG. 1.

FIG. 10 is a block diagram of the solenoid actuator 700 which energizes or de-energizes the solenoid 800 in response to the application of the upshift signal or downshift signal from the generator 400 or 500. The solenoid actuator 700 comprises a bistable memory 731 for storing the upshift signal applied to an input terminal 721 and the downshift signal applied to another input terminal 720, and an acutating circuit 740 for converting the output signal of the memory 731 into a solenoid actuating signal. The circuit 731 shown in FIG. 10 is an example of memory circuit and other circuits can be used for this purpose. The actuating circuit 740 is composed of transistors 741 and 712, a load resistor 716 for the transistor 741, bias resistors 713, 714 and 715 for the transistor 741, and a diode 717 for protecting transistor 712 against unusually high surge voltage occurring across the solenoid 800.

Referring to FIG. 10, an output signal of low voltage level appears on an output lead 722 of the memory 731 in response to the application of the downshift signal of high voltage level to the input terminal 720, while an output signal of high voltage level appears on the output lead 722 in response to the application of the upshift signal of high voltage level to the input terminal 721. The output signal of low voltage level appearing on the output lead 722 in response to the application of the downshift signal to the input terminal 720 of the memory 731 is applied across the series bias resistors 714 and 715 thereby cutting off the transistor 711. As a result, the transistor 712 conducts due to the fact that base current is supplied through the resistor 716, and the solenoid 800 is de-energized for carrying out a downshift. On the other hand, an output signal of high voltage level appears on the output lead 722 in response to the application of the upshift signal to the input terminal 721 of the memory 731. The transistor 741 conducts and the transistor 712 is cut off so that the solenoid 800 is energized for carrying out an upshift.

Figure 11:
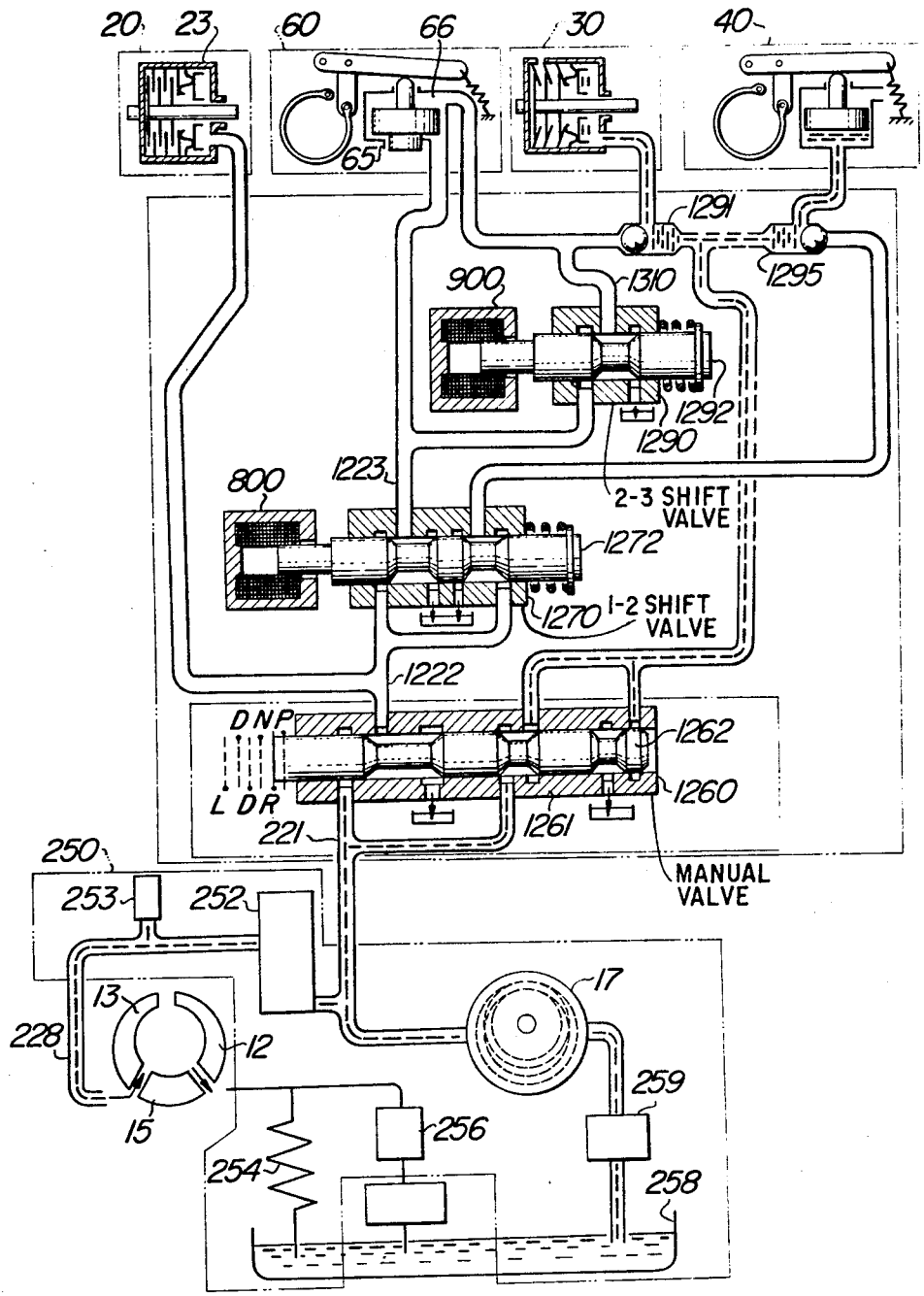
FIG. 11 is a diagram showing for reference the combination of a solenoid shown in FIG. 10 and a hydraulic actuating system.

FIG. 11 shows, for purposes of reference, a combination of the solenoid 800 and a hydraulic acuating system for a three-forward speed automatic transmission. The hydraulic actuating system consists of a fluid pressure source 250 and a hydraulic actuating circuit 230. The hydraulic actuating circuit 230 includes a manual valve 1260, shift valves 1270 and 1290, a 1–2 shift solenoid 800, a 2–3 shift solenoid 900, check valves 1291 and 1295, and fluid passages. The fluid pressure source 250 includes a hydraulic pump 17, an oil filter 259, an oil reservoir 258, a pressure regulating valve 256, a pressure control valve 252, a relief valve 253, an oil cooler 254, and fluid passages. The 2–3 shift solenoid 900 is controlled by a system of a structre similar to that of the system which controls the 1–2 shift solenoid 800.

It will be understood from the foregoing description that the digital signals representative of the driving conditions of the vehicle are used for electrically shifting the gear position at a plurality of predetermined shift points in the system according to the present invention. This is advantageous in that integrated circuits of high precision and high reliability can be incorporated in the system.

In detecting the vehicle speed which is one of the factors for shifting the gear position, the output signal of an r.p.m. detecting AC generator mounted on the output shaft of the transmission is applied to a vehicle speed converter to be converted into a pulse signal and the number of pulses appearing within unit time is counted to be compared with the number of pulses corresponding to a predetermined vehicle speed setting so that this digital vehicle speed signal is utilized for determining whether the vehicle speed is higher or lower than the predetermined setting. The digitization of the vehicle speed is advantageous in that a stable vehicle speed responsive signal can be obtained which is free from any variation in the resistance of the windings of the r.p.m. detecting AC generator, variation in the reluctance and permeability of the magnetic material forming the magnetic circuit of the AC generator, variation in the output voltage due to fluctuation in the dimensions of the air gap portion of the magnetic circuit depending on the manufacturing technique and variation in the power supply voltage.

The amount of depression of the accelerator pedal or the throttle valve opening which is another factor for shifting the gear position is divided into a plurality of ranges by use of a multicontact switch which makes on-off operation, and the multicontact switch is connected to an accelerator pedal position converter for converting the accelerator pedal position into a digital throttle position signal. That is, the multicontact switch makes on-off operations in synchronism with the actuation of the accelerator pedal and the output from the multicontact switch is digitized so as to convert the amount of depression of the accelerator pedal into a digital throttle position signal representative of the accelerator pedal position or throttle valve opening. The digitization of the accelerator pedal position is advantageous in that a stable accelerator pedal position responsive signal can be obtained which is free from any variations in the ambient temperature and power supply voltage.

The digital vehicle speed signals representative of the vehicle speed and the digital throttle position signals representative of the accelerator pedal position are applied to AND gates whose number is equal to the number of the digital throttle position signals and the outputs from the AND gates are applied to an OR gate. The output from the OR gate is an upshift or downshift signal which is applied to a memory in a solenoid actuator for shifting the gear position of the automatic transmission. All these operations are carried out digitally by logic circuits so that a stable shift signal can be obtained.

We claim:

1. A system for shifting the gear position of an automatic transmission for an automotive vehicle at a plurality of predetermined shift points comprising means for producing a plurality of digital vehicle speed signals each representative of a vehicle speed lying within one of a plurality of vehicle speed ranges, means for producing a plurality of digital throttle position signals each representative of a throttle position among a plurality of throttle positions, a plurality of AND gates whose number is equal to the number of said digital throttle position signals, means for applying said digital vehicle speed signals and said digital throttle position signals to the corresponding one of said AND gates so as to derive respective outputs from said AND gates, an OR gate connected to said AND gates, a memory connected to said OR gate for storing the output from said OR gate, and means for applying the signal stored in said memory to actuating means for shifting the gear position of said automatic transmission.

* * * * *

UNITED STATES PATENT OFFICE
CERTIFICATE OF CORRECTION

Patent No. 3,727,488     Dated April 17, 1973

Inventor(s) Hisato Wakamatsu; Hiroshi Fujinami; Tokuhiro Kurebayashi

It is certified that error appears in the above-identified patent and that said Letters Patent are hereby corrected as shown below:

In the heading:

[73] Assignee:

read "Nipponsenso Co., Ltd.," as
-- Nippondenso Co., Ltd. --

Signed and sealed this 12th day of February 1974.

(SEAL)
Attest:

EDWARD M. FLETCHER, JR.
Attesting Officer

C. MARSHALL DANN
Commissioner of Patents